United States Patent
Wallat et al.

(10) Patent No.: US 8,444,177 B2
(45) Date of Patent: May 21, 2013

(54) ASSEMBLY WITH AN INSTRUMENT PANEL FOR A MOTOR VEHICLE AND A KNEE AIRBAG

(75) Inventors: Nico Wallat, Dachau (DE); Marcus Wagner, Erlangen (DE)

(73) Assignee: Autoliv Development AB, Vargarda (SE)

( * ) Notice: Subject to any disclaimer, the term of this patent is extended or adjusted under 35 U.S.C. 154(b) by 231 days.

(21) Appl. No.: 12/072,221

(22) Filed: Feb. 25, 2008

(65) Prior Publication Data

US 2009/0212541 A1    Aug. 27, 2009

(51) Int. Cl.
*B60R 21/206* (2011.01)

(52) U.S. Cl.
USPC .................................. 280/730.2; 280/728.3

(58) Field of Classification Search
CPC ...................................................... B60R 21/206
USPC ........................................... 280/730.2, 728.3
See application file for complete search history.

(56) References Cited

U.S. PATENT DOCUMENTS

| | | | | |
|---|---|---|---|---|
| 3,951,427 A * | 4/1976 | Wilfert | .......................... | 280/732 |
| 4,053,130 A * | 10/1977 | Birkner | .......................... | 248/27.3 |
| 4,759,568 A * | 7/1988 | Paefgen et al. | .................. | 280/732 |
| 4,948,168 A * | 8/1990 | Adomeit et al. | .................. | 280/732 |
| 5,195,776 A * | 3/1993 | Sakakida et al. | ............... | 280/732 |
| 5,797,620 A * | 8/1998 | Eyrainer | .................... | 280/730.1 |
| 5,857,726 A * | 1/1999 | Yokoyama et al. | ............. | 296/70 |
| 5,865,468 A * | 2/1999 | Hur | ............................... | 280/752 |
| 5,895,069 A * | 4/1999 | Heilig et al. | ................ | 280/730.1 |
| 5,971,431 A * | 10/1999 | Wohllebe et al. | ............. | 280/732 |
| 6,217,059 B1 | 4/2001 | Brown et al. | | |
| 6,276,713 B1 * | 8/2001 | Duletzke | ........................ | 280/732 |
| 6,322,122 B2 * | 11/2001 | Burns et al. | ................... | 296/24.3 |
| 6,398,256 B1 * | 6/2002 | Saito | ............................... | 280/732 |
| 6,435,548 B2 * | 8/2002 | Suzuki et al. | ................. | 280/732 |
| 6,464,246 B2 * | 10/2002 | Bayley | ........................ | 280/728.1 |
| 6,464,255 B1 * | 10/2002 | Preisler et al. | ................ | 280/752 |
| 6,536,802 B1 * | 3/2003 | Sutherland et al. | .......... | 280/752 |
| 6,575,495 B2 * | 6/2003 | Calder | ........................ | 280/728.2 |
| 6,715,789 B2 * | 4/2004 | Mizuno et al. | .............. | 280/730.1 |
| 6,910,714 B2 * | 6/2005 | Browne et al. | .............. | 280/753 |
| 7,159,901 B2 * | 1/2007 | Wang et al. | .................... | 280/752 |
| 7,261,318 B2 * | 8/2007 | Enders | ........................ | 280/732 |
| 7,314,231 B2 * | 1/2008 | Abe et al. | .................... | 280/730.1 |
| 7,434,837 B2 * | 10/2008 | Hotta et al. | ................ | 280/743.2 |
| 7,641,223 B2 * | 1/2010 | Knowlden | ................ | 280/728.3 |
| 7,681,908 B2 * | 3/2010 | Fukawatase et al. | ...... | 280/728.3 |
| 7,766,374 B2 * | 8/2010 | Abele et al. | ................ | 280/730.1 |
| 7,850,198 B2 * | 12/2010 | Hayakawa et al. | ........ | 280/730.1 |
| 7,891,726 B2 * | 2/2011 | Gavrilov | .................. | 296/187.05 |

(Continued)

FOREIGN PATENT DOCUMENTS

| | | |
|---|---|---|
| DE | 19749585 | 5/1999 |
| DE | 19946477 | 3/2001 |

(Continued)

*Primary Examiner* — Paul N Dickson
*Assistant Examiner* — Karen Beck
(74) *Attorney, Agent, or Firm* — Harness, Dickey & Pierce, P.L.C.

(57) ABSTRACT

An airbag housing is carried on a formed part extending from a lower section of an instrument panel for a motor vehicle. The formed part forms at least a front section of an upper wall of a footwell assigned to the vehicle occupants. A knee airbag is disposed in the airbag housing.

33 Claims, 5 Drawing Sheets

U.S. PATENT DOCUMENTS

| | | | |
|---|---|---|---|
| 7,967,327 B2* | 6/2011 | Kim | 280/728.2 |
| 8,220,830 B2* | 7/2012 | Takimoto et al. | 280/730.1 |
| 2002/0130529 A1* | 9/2002 | Takano | 296/70 |
| 2002/0171231 A1* | 11/2002 | Takimoto et al. | 280/730.1 |
| 2003/0057692 A1* | 3/2003 | Horsch et al. | 280/752 |
| 2004/0201209 A1* | 10/2004 | Schwark et al. | 280/743.1 |
| 2005/0052009 A1 | 3/2005 | Abe | |
| 2005/0052011 A1* | 3/2005 | Best et al. | 280/752 |
| 2005/0062264 A1* | 3/2005 | Arwood et al. | 280/730.1 |
| 2005/0151351 A1* | 7/2005 | Enders et al. | 280/730.1 |
| 2005/0194767 A1 | 9/2005 | Freisler et al. | |
| 2006/0022440 A1* | 2/2006 | Umehara | 280/730.1 |
| 2007/0126212 A1* | 6/2007 | Takimoto et al. | 280/730.1 |
| 2007/0176473 A1* | 8/2007 | Sakai et al. | 297/216.12 |
| 2008/0116669 A1* | 5/2008 | Adachi et al. | 280/730.1 |
| 2008/0122204 A1* | 5/2008 | Fukawatase et al. | 280/728.3 |
| 2008/0174091 A1* | 7/2008 | Hoshino et al. | 280/728.3 |
| 2009/0212541 A1 | 8/2009 | Wallat et al. | |
| 2010/0066064 A1* | 3/2010 | Kotikovsky | 280/728.3 |
| 2010/0102539 A1* | 4/2010 | Fukawatase et al. | 280/728.3 |
| 2011/0006506 A1* | 1/2011 | Fukawatase et al. | 280/728.3 |
| 2011/0109070 A1* | 5/2011 | Tanaka et al. | 280/741 |
| 2011/0241319 A1* | 10/2011 | Chavez | 280/730.1 |
| 2012/0007345 A1* | 1/2012 | Lee | 280/728.2 |
| 2012/0049488 A1* | 3/2012 | Enders | 280/728.3 |

FOREIGN PATENT DOCUMENTS

| | | |
|---|---|---|
| DE | 102004047332 | 6/2005 |
| DE | 202006001826 | 6/2006 |
| EP | 1431131 | 6/2004 |
| GB | 2408027 | 5/2005 |
| JP | 9123857 | 5/1997 |
| JP | 2004067024 | 3/2004 |
| JP | 2004352119 | 12/2004 |
| JP | 2005254904 | 9/2005 |
| JP | 2007331655 | 12/2007 |

* cited by examiner

ASSEMBLY WITH AN INSTRUMENT PANEL FOR A MOTOR VEHICLE AND A KNEE AIRBAG

FIELD

The present disclosure relates to an assembly with an instrument panel for a motor vehicle and a knee airbag.

BACKGROUND

The statements in this section merely provide background information related to the present disclosure and may not constitute prior art.

An assembly of the generic type is described, for example, in U.S. Pat. No. 6,217,059 B1 or US 2002/0171231 A1. Here, the housing which accommodates the airbag is located on the inner side of a lower section of the instrument panel and is rigidly fixed to this. The exit opening of the housing for the airbag here lies opposite the knee-shin area of the vehicle occupant to be protected, in other words of the driver or the passenger, and is basically parallel to the surface of the instrument panel. In case of operation, the knee airbag is inflated between the instrument panel and the knee-shin area of the vehicle occupant to be protected. The knee airbag serves primarily to prevent the forward movement of the pelvis of a vehicle occupant, in particular of a vehicle occupant who is not wearing a seat belt, from being displaced forwards in case of a frontal collision.

SUMMARY

The significance of a knee airbag for the overall safety concept of a motor vehicle differs from region to region. In particular in the USA, where the wearing of seatbelts may not be a legal obligation, and where it is often unusual to wear a seat belt, the significance of the knee airbag for the safety concept of a motor vehicle is often extremely high. In Europe, in contrast, where the legal obligation to wear a seatbelt is generally observed, the significance of the knee airbag for the safety concept of a motor vehicle is often slight, or it can be more useful to save the weight of the knee airbag unit and to invest it in another safety device.

This means that it is often the case that one and the same vehicle type is offered in the USA with knee airbag, but in Europe without.

This again results in the need for development and manufacture of different instrument panels for one and the same type of vehicle. Because of the size and complexity of the instrument panels, this leads to a very great deal of additional development and manufacturing work, with the associated costs.

Starting from this point, the present teachings have the task of improving the generic type of assembly in such a way that the development and manufacturing time and expense is decreased, if a vehicle type is to be offered with the equipment variants with and without knee airbag.

According to the present teachings, the housing is not located on or in the instrument panel, but on a formed part which follows on from the lower section of the instrument panel. Generally, therefore, this formed part forms at least the front section of the upper wall of the footwell which is assigned to the vehicle occupants. Because the housing of the knee airbag is no longer a part of the instrument panel or is connected with it, the same instrument panel can always be used, independently of whether the vehicle is to be fitted with a knee airbag or not. It is only necessary to stock two differently-formed parts, which, however, are considerably smaller and considerably less complex than the instrument panel. It is even possible always to make use of the same formed part, and, for the case that no knee airbag is to be used, to make use of an additional cover element which covers the exit opening of the housing. Such a process becomes even more simple, as the exit opening of the housing in the arrangement according to the disclosure can lie in an area which is not seen by the vehicle occupants, so that excessive time and expense with regard to a visible gap and similar can be avoided.

As, during the expansion of an airbag, i.e. when the gas generator which inflates the airbag is operated, considerable forces occur, as is already known, it is often to be preferred if the formed part which bears the housing is directly linked with a lateral strut of the motor vehicle.

In order to prevent gaps, the formed part should be connected with the instrument panel. For reasons of simple assembly, it is preferred that at least one part of the necessary connection elements is in the form of a clip connection.

The housing which accommodates the knee airbag can be a separate component which is connected with the formed part, or the housing can be an integral component of the formed part.

Further embodiments of the present teachings result from the further subclaims as well as from the embodiments now described in more detail by means of the Figures. The Figures are as follows:

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

The following description is merely exemplary in nature and is not intended to limit the present disclosure, application, or uses. It should be understood that throughout the drawings, corresponding reference numerals indicate like or corresponding parts and features.

Figure 1:
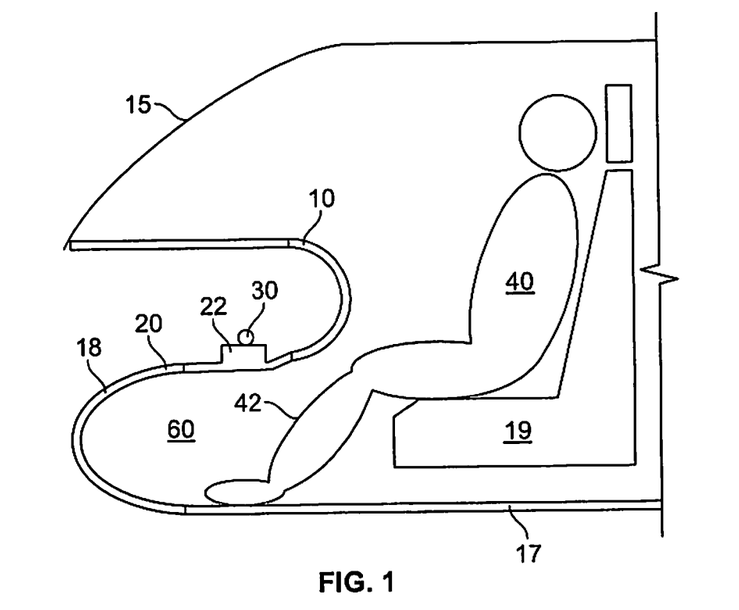
FIG. 1 is a lengthways section through the front area of an occupant cabin of a motor vehicle in schematic form.

FIG. 1 shows a schematic section through the front passenger side of a motor vehicle. In front of vehicle seat 19 there is instrument panel 10, under which footwell 60 is located. In the normal seat position, the knee-shin area 42 of passenger 40 is located in front of a lower section of instrument panel 10. The knee-shin area 42 is hereby at a distance from instrument panel 10.

Figure 2:
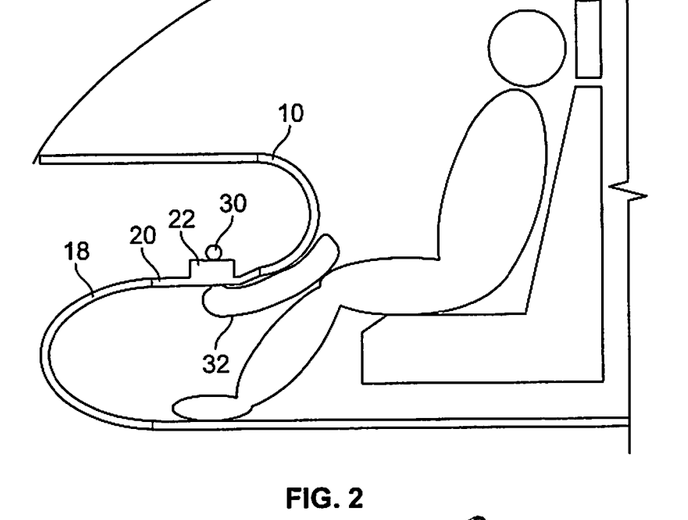
FIG. 2 illustrates the items shown in FIG. 1 with the knee airbag inflated.

As can be seen from FIG. 2, a knee airbag 32 is present which is inflated by a gas generator 30 in case of a frontal collision. At least a part of this knee airbag 32 is located in fully expanded state between the knee-shin area 42 of occupant 40 and a lower section of instrument panel 10. In particular when the passengers or drivers are not belted in, knee airbag 32 prevents forward movement of the pelvis. Furthermore, collision of the sensitive knee-shin area 42 against instrument panel 10 is prevented.

As can be seen from FIGS. 1 and 2, housing 22 of the knee airbag unit is located on a formed part 20, which extends from the lower section of instrument panel 10 in the direction of the front of the vehicle, and hereby forms at least a part of the ceiling of footwell 60. Formed part 20, which in general is an injection moulded part of plastic, hereby lies basically horizontal. Housing 22 can be an integral part of formed part 20, or housing 22 can be a separate component, which is rigidly connected with formed part 20. Footwell cladding 18 follows on at the rear section of formed part 20.

Figure 1A:
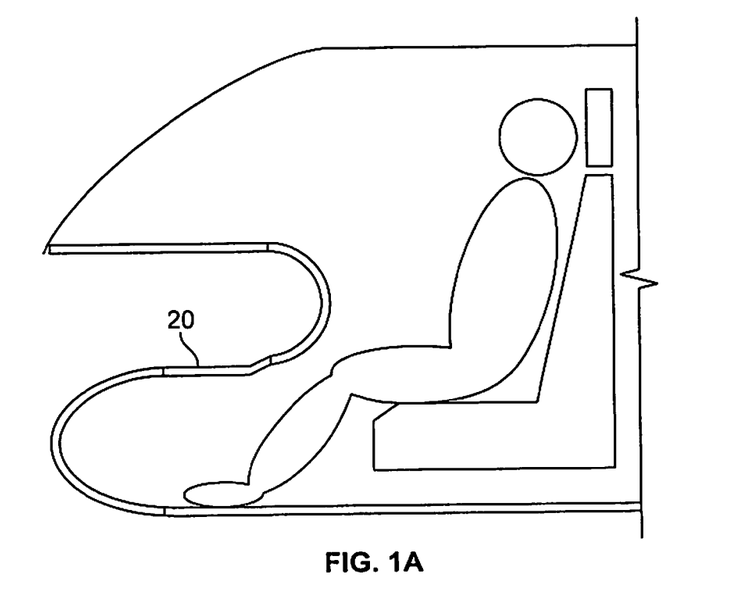
FIG. 1a illustrates the items shown in FIG. 1 in an equipment variant without a knee airbag.

In comparison with instrument panel 10, formed part 20 is a small and mechanically simple component. This means that only a comparatively slight expenditure of cost and effort is required to manufacture it in a version with airbag unit (see FIG. 1) and in a version without airbag unit (see FIG. 1a). By these means, on the other hand, it is easy in one and the same type of vehicle to manufacture a version with knee airbag and a version without knee airbag. It is only necessary in final assembly with the first vehicle version to mount the first type of formed part 20 and in the second vehicle version to mount the second type of formed part connected to instrument panel 10. If the version with knee airbag unit is selected, this generally can be connected to the same sensor system as the front airbag, which is always present.

Figure 3:
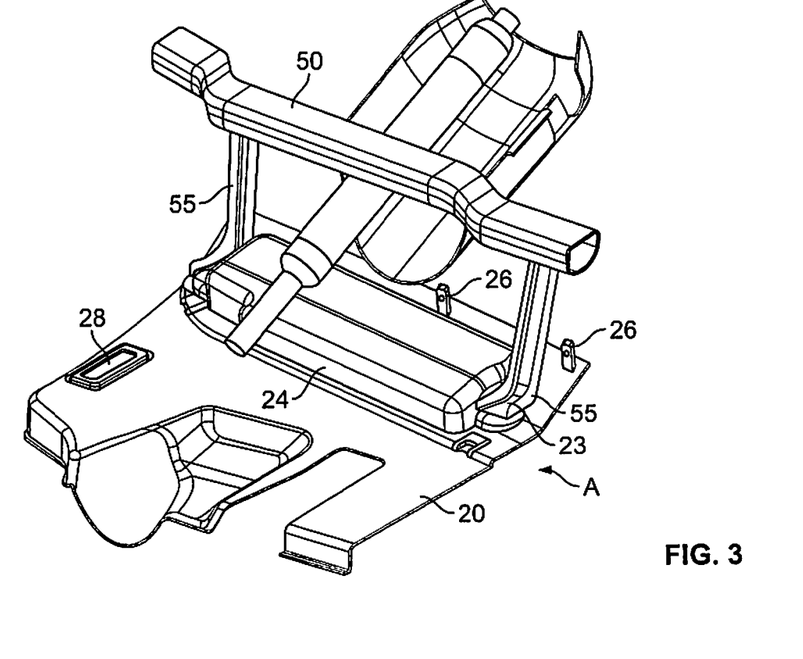
FIG. 3 illustrates the lower part of an instrument panel, a formed part and a steering column in a perspective view.
Figure 4:
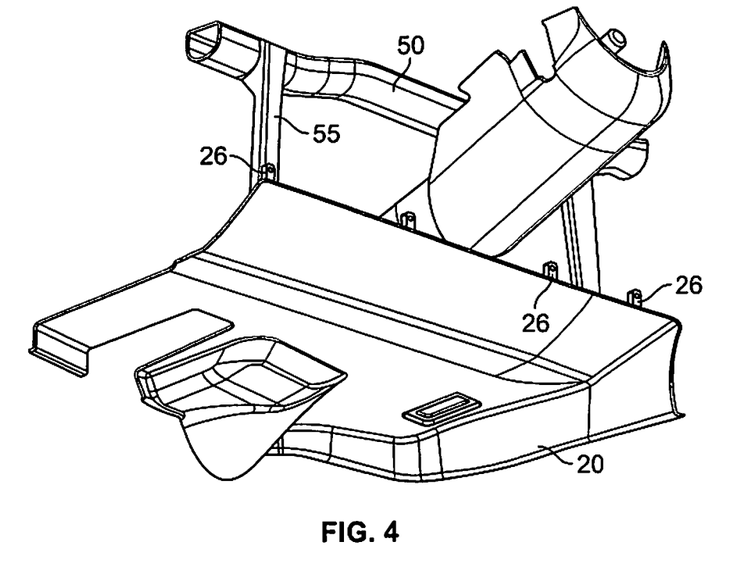
FIG. 4 illustrates the items shown in FIG. 3 in a different perspective.
Figure 5:
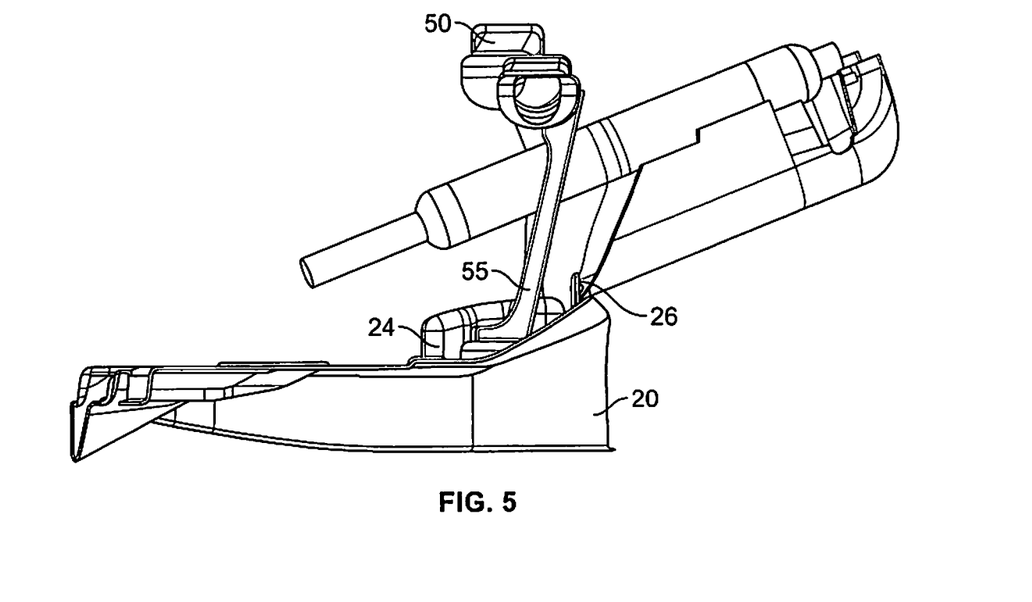
FIG. 5 illustrates the formed part from FIGS. 3 and 4.
Figure 6:
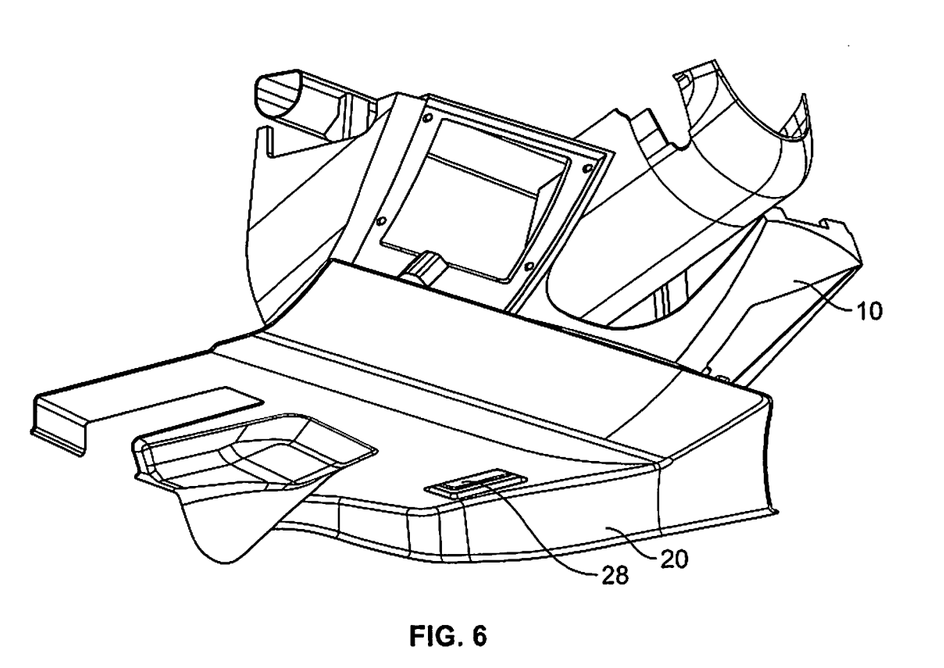
FIG. 6 illustrates the formed part from FIG. 5 in a bird's eye view from Direction A.

FIGS. 3 to 6 show a first concrete embodiment of formed part 20, whereby FIGS. 3 and 4 show formed part 20 in its mounted state at a lower section of instrument panel 10 and FIGS. 5 and 6 show the formed part in its non-mounted state. It can be seen, that here the knee airbag is the knee airbag for the driver's side. The structure of formed part 20 will now be explained in relation to FIGS. 5 and 6.

In the area of the front edge, there are latching elements 26 over which formed part 20 can be latched on instrument panel 10. Immediately behind latching elements 26 is housing 22, formed in one piece onto formed part 20, in which the knee airbag and the gas generator are accommodated. Housing 22 continues to exhibit a cover 24 on the rear side, which covers a rear opening. The gas generator and the knee airbag are mounted through this rear opening. Basically opposite to this rear cover 24 is the exit opening for the knee airbag, not shown here, which is closed by a cover element. This cover element can be formed in one piece with formed part 20 and can be surrounded by a set break line.

Next to housing 22 are fixing holes 23, through which screws extend when in mounted state, which are screwed together with instrument panel 10. Together with latching elements 26, a sufficiently stable fixing of formed part 20 to instrument panel 10 results (see also FIG. 3). The fixing element here basically surrounds housing 22, so that the forces which occur during expansion of the airbag can also be absorbed. Because of the inherent stiffness of formed part 20 it is not necessary to provide additional fixing elements on the rear section of formed part 20.

This means that mounting of the formed part on instrument panel 10 is extremely simple, as can particularly be seen in FIGS. 3 and 4: first formed part 20 with its latching elements 26 is latched onto the instrument panel 10 which is generally already mounted in the vehicle and then screwed together. By means of this modular structure, it is particularly also possible to retrofit a knee airbag to a vehicle which was originally supplied in the version without knee airbag. It is only necessary to exchange the formed part which was originally mounted, which does not exhibit a knee airbag, for a formed part with a knee airbag unit, and to connect the gas generator to the existing sensor system. As formed part 20, as already mentioned, forms the ceiling or a part of the ceiling of footwell 60, therefore formed part 20 exhibits through-holes 28 for ventilation.

Figure 7:
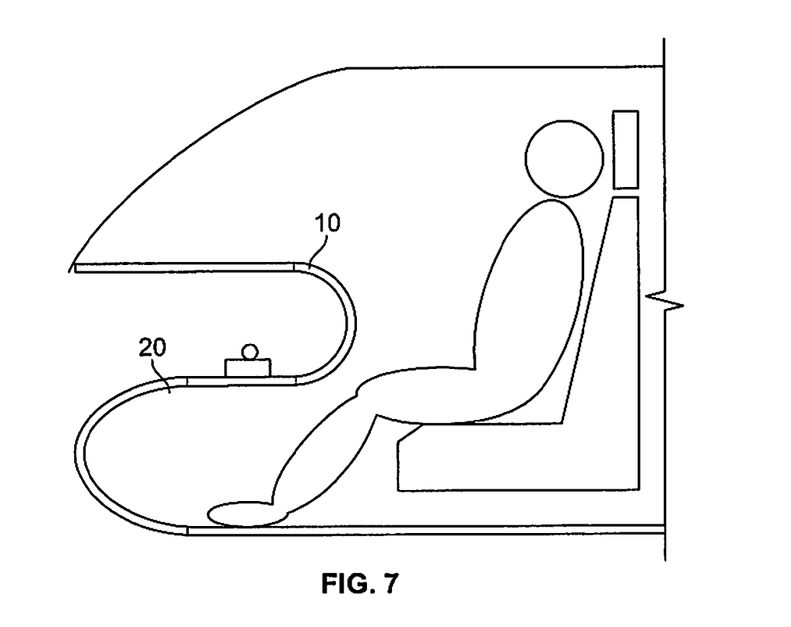
FIG. 7 illustrates the lower part of an instrument panel and a formed part according to a second embodiment of the invention in a side view.

FIG. 7 shows a concrete version of the second embodiment of the invention. Here, formed part 20 extends fully horizontally, so that the exit opening for knee airbag 32 lies in a horizontal plane. This has the particular advantage that the transitional point between the lower section of instrument panel 10 and formed part 20 cannot be seen by the vehicle occupants, so that here a relatively wide gap can be provided. It is possible to see here also that formed part 20 follows on directly from a lateral strut 50 of the motor vehicle, with which it is preferably also directly connected. This means that forces which occur when the knee airbag expands are led directly into this lateral strut, without placing stress on instrument panel 10. The invention is shown here using a knee airbag unit for the passenger; the glove compartment 14 of instrument panel 10 can be seen. Formed part 20 can in particular be an injection moulded or deep-drawn part of plastic.

Figure 8:
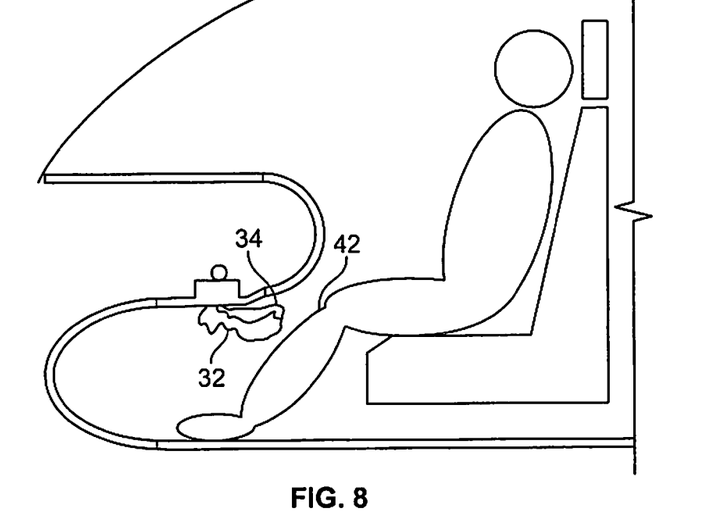
FIG. 8 illustrates the items shown in FIG. 1 during inflation of the knee airbag, whereby the upper end of the knee airbag is connected with the housing by means of a capture tape.
Figure 9:
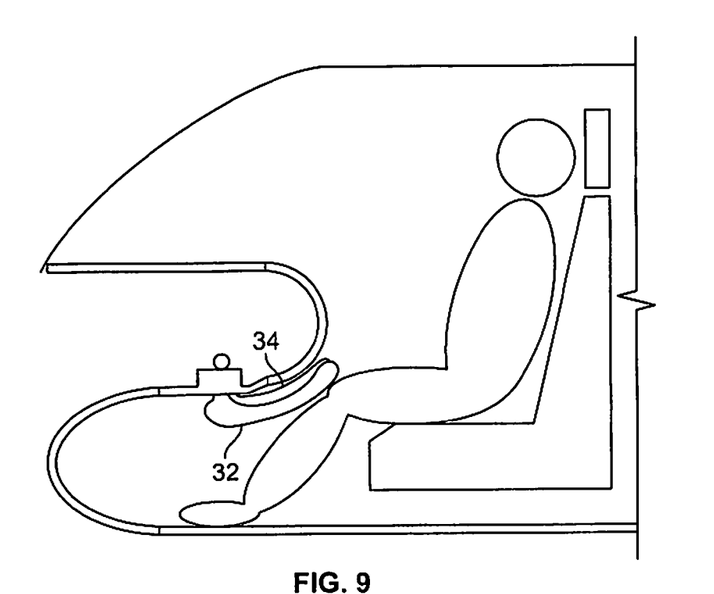
FIG. 9 illustrates the items shown in FIG. 8 with the knee airbag fully expanded.

As can be seen in FIGS. 8a and 9, a capture tape can be present running outside knee airbag 32, which helps to position knee airbag 32 between instrument panel 10 and knee-shin area 42 of the vehicle occupants. Such a capture tape 34 can be necessary, as depending on the particular embodiment, in particular in the embodiment shown in FIG. 7, the exit opening for knee airbag 32 is located fairly far away from the knee-shin area 42 of the vehicle occupants.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. An assembly for a motor vehicle comprising:
   an instrument panel having a lower side that terminates at a forward edge;

a footwell cladding defining a first portion of a ceiling of a footwell of the motor vehicle and terminating at a rearward edge, an opening defined between the instrument panel forward edge and the footwell cladding rearward edge, wherein the opening, the forward edge and the rearward edge are all positioned within a single first plane;

a first formed part sized and shaped to be selectively insertable into the opening so as to extend in a direction toward a front of the motor vehicle from the forward edge of the instrument panel to the rearward edge, the first formed part oriented generally horizontally and defining at least a second portion of the ceiling, the second portion positioned within the single first plane;

a housing attached to and carried by the first formed part, the housing defining an exit opening for the airbag, the exit opening disposed in a horizontal plane; and an airbag in the housing when stored and which on activation extends through the exit opening, into the footwell from a point forward of the forward edge of the instrument panel and is inflated from the point forward of the forward edge of the instrument panel to a position between the lower side of the instrument panel and a knee-shin area of a vehicle occupant to be protected.

2. The assembly according to claim 1, wherein the first formed part is selectively connected with the forward edge of the instrument panel.

3. The assembly according to claim 2, wherein the first formed part is latched together with the forward edge of the instrument panel by clip connections.

4. The assembly according to claim 1, wherein the first formed part is selected from a group including an injection moulded part and a deep-drawn part of plastic.

5. The assembly according to claim 1, wherein the housing is an integral part of the first formed part.

6. The assembly according to claim 1, wherein the housing is a separate element which is connected with the first formed part.

7. The assembly of claim 1, wherein the airbag is configured upon inflation to include an upper side in communication with the housing.

8. The assembly of claim 1, wherein the airbag is configured to include a forward end and a rearward end which both are introduced into the footwell at the point of the forward edge of the instrument panel and upon inflation the forward end disposed immediately below the housing.

9. The assembly of claim 8, wherein the airbag is configured upon inflation such that the rearward end is disposed higher than the forward end.

10. The assembly of claim 1, wherein the airbag is configured upon inflation to have a length between a forward end and a rearward end, the length being greater than a height generally perpendicular to the length.

11. The assembly of claim 7, wherein a forward end of the airbag is disposed immediately below the housing.

12. The assembly of claim 1, wherein removal of the first formed part from the opening and the instrument panel removes the housing and the airbag stored therein from the opening.

13. The assembly of claim 1, wherein the single first plane includes a single horizontal plane, and wherein the first formed part and the opening are each positioned fully in the single horizontal plane.

14. An assembly for a motor vehicle comprising:

an instrument panel for generally facing a vehicle occupant, the instrument panel having a lower side that terminates at a forward edge;

a footwell cladding defining a first portion of a ceiling of a footwell of the motor vehicle, the first portion terminating at a rearward edge that is spaced apart from the forward edge so as to define a gap between the instrument panel and the footwell cladding;

a first formed part sized and shaped to be selectively insertable into the gap so as to forwardly extend from the forward edge of the instrument panel toward the rearward edge of the cladding, the first formed part oriented generally horizontally and defining a second portion of the ceiling of the footwell of the motor vehicle, the first formed part, the forward edge and the rearward edge positioned within a single first plane, the first formed part defining an integrally formed housing extending from an upper side thereof and defining an exit opening disposed in a horizontal plane; and an airbag normally stored in the housing and which upon activation extends through the exit opening, into the footwell and is inflated between the lower side of the instrument panel and a knee-shin area of the vehicle occupant.

15. The assembly of claim 11, wherein the airbag is configured upon inflation to include an upper side in communication with the housing.

16. The assembly of claim 14, wherein the airbag is configured upon inflation to include a forward end and a rearward end, the forward end disposed immediately below the housing.

17. The assembly of claim 16, wherein the airbag is configured upon inflation such that the rearward end is disposed higher than the forward end.

18. The assembly of claim 14, wherein the airbag is configured upon inflation to have a length between a forward end and a rearward end, the length being greater than a height generally perpendicular to the length.

19. The assembly of claim 16, wherein a forward end of the airbag is disposed immediately below the housing.

20. An assembly for a motor vehicle comprising:

an instrument panel having a lower side that terminates at a forward edge;

a first formed part having a first size and a first shape configured to be selectively disposed relative to the instrument panel so as to extend in a direction toward a front of the motor vehicle from the forward edge of the instrument panel, the first formed part defining at least a portion of a ceiling of a footwell of the motor vehicle, the first formed part positioned substantially in a single horizontal plane;

a housing fixed to the first formed part, the housing defining an exit opening, the exit opening positioned in the single first plane;

an airbag normally stored in the housing, extendable through the exit opening into the footwell from a point forward of the forward edge of the instrument panel, and inflatable from the point forward of the forward edge of the instrument panel to a position between the lower side of the instrument panel and a knee-shin area of a vehicle occupant to be protected, a forward end of the airbag disposed immediately below the housing; and a capture strap coupled to the airbag about an exterior thereof such that the capture strap runs outside the airbag and facilitates positioning the airbag in the knee-shin area.

21. The assembly of claim 20, further comprising a footwell cladding defining a first portion of a ceiling of a footwell of the motor vehicle and terminating at a rearward edge spaced apart from the forward edge, wherein an opening is defined between the instrument panel forward edge and the footwell cladding rearward edge, and wherein the first formed part is selectively positioned in the opening.

22. The assembly of claim 21, further comprising a second formed part having the first size and the first shape and configured to be selectively positioned in the opening and selectively coupled to the instrument panel so as to extend in the direction toward the front of the motor vehicle from the forward edge of the instrument panel, the second formed part selectively defining at least the portion of the ceiling of the footwell and including an absence of the housing and the airbag normally stored therein.

23. The assembly of claim 20, wherein the capture strap is coupled to the forward end of the airbag.

24. The assembly of claim 1, further comprising a second formed part sized and shaped to be selectively positioned into the opening and coupled to the instrument panel so as to extend in the direction toward the front of the vehicle from the forward edge of the instrument panel, the second formed part including an absence of the housing and the stored airbag and selectively defining the second portion of the ceiling.

25. The assembly of claim 14, further comprising a second formed part sized and shaped to be selectively positioned into the gap and coupled to the instrument panel so as to extend in the direction toward the front of the vehicle from the forward edge of the instrument panel, the second formed part including an absence of the housing and the airbag normally stored therein and selectively defining the second portion of the ceiling.

26. The assembly of claim 1, whereby the instrument panel is manufactured independently of the first formed part such that the motor vehicle can selectively include the first formed part and associated airbag depending on a desired feature content of the motor vehicle.

27. The assembly of claim 14, whereby the instrument panel is manufactured independently of the first formed part such that the motor vehicle can selectively include the first formed part and associated airbag depending on a desired feature content of the motor vehicle.

28. An assembly for a motor vehicle comprising:
an instrument panel having a lower side that terminates at a forward edge;
a footwell cladding defining a first portion of a ceiling of a footwell of the motor vehicle and terminating at a rearward edge spaced apart from the forward edge, an opening defined between the instrument panel forward edge and the footwell cladding rearward edge;
a first formed part sized and shaped to be selectively insertable into the opening so as to extend in a direction toward a front of the motor vehicle from the forward edge of the instrument panel to the rearward edge, the first formed part defining at least a second portion of the ceiling, the forward edge, the rearward edge and the first formed part positioned fully within a single first plane;
a housing attached to and carried by the first formed part, the housing defining an exit opening for the airbag, the exit opening disposed within the single first plane;
an airbag in the housing when stored and which on activation extends through the exit opening, into the footwell from a point forward of the forward edge of the instrument panel and is inflated from the point forward of the forward edge of the instrument panel to a position between the lower side of the instrument panel and a knee-shin area of a vehicle occupant to be protected; and
a second formed part sized and shaped to be selectively positioned into the opening and coupled to the instrument panel so as to extend in the direction toward the front of the vehicle from the forward edge of the instrument panel, the second formed part including an absence of the housing and the stored airbag and selectively defining the second portion of the ceiling, the second formed part positioned within the single first plane;
whereby the instrument panel is manufactured independently of the first formed part such that the motor vehicle can selectively include the first formed part and associated airbag depending on a desired feature content of the motor vehicle.

29. The assembly of claim 13, wherein the exit opening is positioned in the horizontal plane.

30. The assembly of claim 14, wherein removal of the first formed part from the gap removes the housing and the airbag normally stored therein from the gap.

31. The assembly of claim 14, wherein the single first plane includes a single horizontal plane, and wherein the first formed part and the gap are each positioned fully in the single horizontal plane.

32. The assembly of claim 20, wherein removal of the first formed part from the instrument panel removes the housing and airbag normally stored therein from an area behind the instrument panel.

33. The assembly of claim 28, wherein the single first plane includes a single horizontal plane, and wherein the first formed part and the opening are each positioned fully in the single horizontal plane.

* * * * *